(12) United States Patent
Li et al.

(10) Patent No.: US 10,013,151 B2
(45) Date of Patent: Jul. 3, 2018

(54) METHOD AND TERMINAL DEVICE FOR ADJUSTING WIDGET

(71) Applicant: Xiaomi Inc., Beijing (CN)

(72) Inventors: Weixing Li, Beijing (CN); Fei Xu, Beijing (CN); Daqing Sun, Beijing (CN); Ying Wang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 628 days.

(21) Appl. No.: 14/586,848

(22) Filed: Dec. 30, 2014

(65) Prior Publication Data

US 2015/0113431 A1    Apr. 23, 2015

Related U.S. Application Data

(63) Continuation-in-part of application No. PCT/CN2013/081535, filed on Aug. 15, 2013.

(30) Foreign Application Priority Data

Aug. 15, 2012 (CN) .......................... 2012 1 0291529

(51) Int. Cl.
*G06F 3/048* (2013.01)
*G06F 3/0484* (2013.01)
*G06F 3/0481* (2013.01)
*H04M 1/725* (2006.01)

(52) U.S. Cl.
CPC .......... *G06F 3/0484* (2013.01); *G06F 3/0481* (2013.01); *G06F 2203/04803* (2013.01); *H04M 1/72522* (2013.01)

(58) Field of Classification Search
CPC ................. G06F 3/0484; G06F 3/0481; G06F 2203/04803
See application file for complete search history.

(56) References Cited

U.S. PATENT DOCUMENTS

| | | | |
|---|---|---|---|
| 5,812,128 A * | 9/1998 | Sterling, IV | G06F 3/04817 715/762 |
| 7,730,422 B2 | 6/2010 | Russo | |
| 8,132,116 B1 * | 3/2012 | Schendel | G06F 3/04817 715/764 |
| 8,411,319 B2 * | 4/2013 | Nguyen | G06K 15/02 345/421 |

(Continued)

FOREIGN PATENT DOCUMENTS

| | | |
|---|---|---|
| CN | 101197867 A | 6/2008 |
| CN | 101222570 A | 7/2008 |
| CN | 101800793 A | 8/2010 |
| CN | 101853158 A | 10/2010 |

(Continued)

OTHER PUBLICATIONS

The International Search Report for PCT/CN2013/081535.

*Primary Examiner* — Omar Abdul-Ali
(74) *Attorney, Agent, or Firm* — Jun He Law Offices P.C.; James J. Zhu (57) ABSTRACT

The present disclosure discloses a method and a terminal device for adjusting a widget. The method includes: acquiring a size value of the widget on an interface of a terminal device after switching a grid configuration of the interface from a first grid configuration to a second grid configuration; and determining the number of grids occupied by the widget according to size values of each grid in the second grid configuration.

15 Claims, 7 Drawing Sheets

(56) References Cited

U.S. PATENT DOCUMENTS

| | | | |
|---|---|---|---|
| 8,745,525 B1* | 6/2014 | Roskind | 715/788 |
| 2006/0112330 A1* | 5/2006 | Iwasaki | G06T 11/60 715/246 |
| 2008/0115081 A1* | 5/2008 | Sankaravadivelu | G06F 3/0481 715/783 |
| 2010/0030901 A1* | 2/2010 | Hallberg | H04N 5/44513 709/228 |
| 2010/0060788 A1 | 3/2010 | Blackburn et al. | |
| 2010/0100470 A1* | 4/2010 | Buchanan | G06Q 10/10 705/35 |
| 2010/0138295 A1 | 6/2010 | Caron et al. | |
| 2010/0146440 A1 | 6/2010 | Seong et al. | |
| 2013/0167080 A1* | 6/2013 | Ari | G06F 3/0481 715/801 |
| 2013/0227389 A1* | 8/2013 | Knox | G06Q 30/016 715/234 |

FOREIGN PATENT DOCUMENTS

| | | |
|---|---|---|
| CN | 101866287 A | 10/2010 |
| CN | 101986300 A | 3/2011 |
| CN | 102073650 A | 5/2011 |
| CN | 102214101 A | 10/2011 |
| CN | 102609164 A | 7/2012 |
| CN | 102811290 A | 12/2012 |
| JP | 04-242792 A | 8/1992 |
| JP | 2005-182463 A | 7/2005 |
| JP | 2010-061570 A | 3/2010 |
| JP | 2012-504267 A | 2/2012 |
| JP | 2012146278 A | 8/2012 |
| KR | 20100064803 A | 6/2010 |
| KR | 20120034827 A | 4/2012 |
| RU | 2408923 C2 | 1/2011 |
| WO | 2010/035162 | 4/2010 |
| WO | 2011/140762 A1 | 11/2011 |
| WO | 2014026623 A1 | 2/2014 |

* cited by examiner

METHOD AND TERMINAL DEVICE FOR ADJUSTING WIDGET

CROSS-REFERENCE TO RELATED APPLICATIONS

This application is a Continuation-In-Part Application of International Application No. PCT/CN2013/081535, filed on Aug. 15, 2013, which is based upon and claims priority to Chinese Patent Application No. CN201210291529.4, filed on Aug. 15, 2012, the entire contents of which are incorporated herein by reference.

TECHNICAL FIELD

The present disclosure relates to communication technology, and more particularly, to a method and a terminal device for adjusting a widget.

BACKGROUND

Currently, mobile phones are considerably common and widespread, and applications for the mobile phones are becoming more plentiful. For more convenient use of the mobile phone features and functions, widgets may be inserted into a mobile phone interface. For example, a clock widget may display the current time on the mobile phone interface. A weather widget may display the current weather on the mobile phone interface.

A grid is used in the configuration of the mobile phone interface, and thus icons, widgets and the like on the interface are arranged according to the grid, so that the contents displayed on the whole interface is arranged in order.

However, currently, the number of grids occupied by the widgets is constant, and cannot be dynamically calculated as the grid configuration changes, thereby resulting in poor display quality of the widgets.

SUMMARY

According to a first aspect of the present disclosure, there is provided a method for adjusting a widget, which includes: acquiring a size value of the widget on an interface of a terminal device after switching a grid configuration of the interface from a first grid configuration to a second grid configuration; and determining the number of grids occupied by the widget according to size values of each grid in the second grid configuration.

According to a second aspect of the present disclosure, there is provided a terminal device for adjusting a widget, including: a processor; and a memory for storing instructions executable by the processor, wherein the processor is configured to perform: acquiring a size value of the widget on an interface of a terminal device after switching a grid configuration of the interface from a first grid configuration to a second grid configuration; and determining the number of grids occupied by the widget according to size values of each grid in the second grid configuration.

According to a third aspect of the present disclosure, there is provided a non-transitory computer-readable storage medium having stored therein instructions that, when executed by a processor of a terminal device, causes the terminal device to perform a method for adjusting a widget, the method including: acquiring a size value of the widget on an interface of a terminal device after switching a grid configuration of the interface from a first grid configuration to a second grid configuration; and determining the number of grids occupied by the widget according to size values of each grid in the second grid configuration.

It is to be understood that both the foregoing general description and the following detailed description are exemplary only and are not restrictive of the present disclosure.

BRIEF DESCRIPTION OF THE DRAWINGS

The accompanying drawings, which are hereby incorporated in and constitute a part of this specification, illustrate embodiments consistent with the invention and, together with the description, serve to explain the principles of the invention.

DETAILED DESCRIPTION

With reference to the appending drawings, embodiments of a method and an apparatus for adjusting a widget and a terminal device according to the present disclosure will be described in detail.

Figure 1:
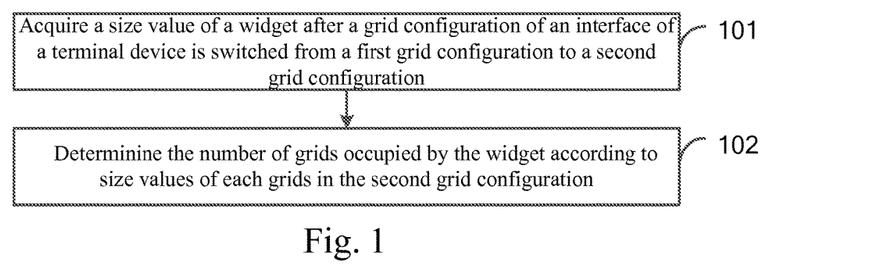
FIG. 1 is a flowchart showing a method for adjusting a widget according to an embodiment of the present disclosure.

A method for adjusting a widget according to an embodiment of the present disclosure may include the following steps, as shown in FIG. 1.

At step 101, a size value of the widget on an interface of a terminal device is acquired after a grid configuration of the interface is switched from a first grid configuration to a second grid configuration.

For example, a selected second grid configuration is acquired after receiving a request for switching a grid configuration of an interface of a terminal device is received, and the first grid configuration is removed and the second grid configuration is adopted as a current grid configuration of the interface.

At step 102, the number of grids occupied by the widget is determined according to size values of each grid in the second grid configuration.

For example, a length ratio is acquired by comparing a length of the widget with a length of a grid. Moreover, the number of latitudinal grids occupied by the widget is acquired according to the length ratio. In the same way, a width ratio of a width of the widget to a width of the grid and the number of longitudinal grids occupied by the widget is acquired according to the width ratio.

Optionally, if the widget is located on an interface of a terminal device, a location of the widget on the interface is adjusted according to the number of grids occupied by the widget. If the widget is not located on the interface, the grid attributes displayed by the widget is adjusted according to the number of grids occupied by the widget.

Optionally, if the number of grids occupied by the widget is an integer, the widget is aligned with grids. If the number of grids occupied by the widget is not an integer, the widget is aligned with a center at its external-connected grids, or the widget is aligned with grids after the length and/or a width of the widget is stretched or contracted to be an integer.

According to the above described contents, in the method for adjusting a widget according to the embodiment of the present disclosure, the size of a widget can be automatically converted into the number of grids in the current grid configuration such that the size of a widget won't be not changed or adapted to the size of the current unit grid, thus the display effect may be improved and the user experience may be improved.

Figure 2:
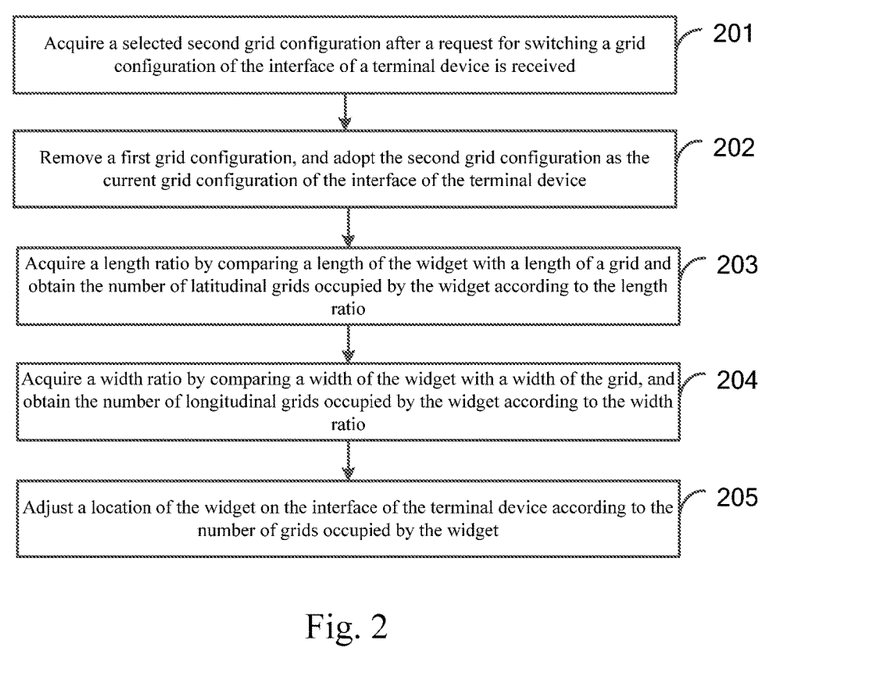
FIG. 2 is a flowchart showing a process for adjusting a widget according to another embodiment of the present disclosure.

The method according to the present disclosure will be further described. As shown in FIG. 2, the method includes the following steps.

At step 201, a selected second grid configuration is acquired after a request for switching a grid configuration of an interface of a terminal device is received.

Figure 3A:
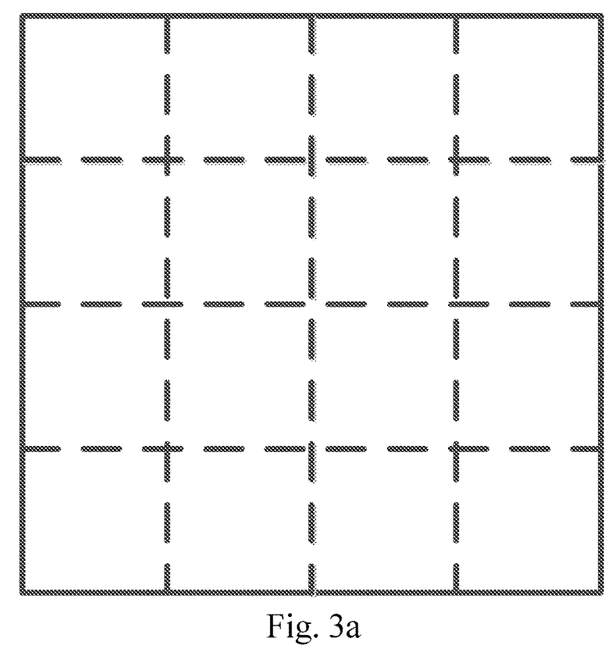
FIG. 3a and FIG. 3b are diagrams showing grids of an interface of a terminal device according to an embodiment of the present disclosure.
Figure 3B:
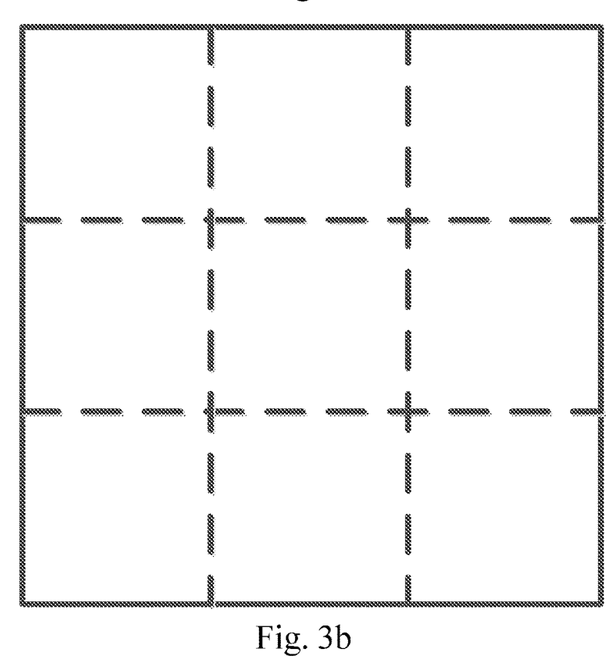

The grid segmentation of an interface of a terminal device may be changed through setting a grid configuration in a system. On the other hand, the grid segmentation of the interface of the terminal device may also be changed by changing a size of font in the terminal device. The grids of the interface may be arranged in advance. A 4*4 grid configuration is shown in FIG. 3a, the terminal device interface may be equally divided into 4*4 rectangles. A 3*3 grid configuration is shown in FIG. 3b, the interface of a terminal device may be equally divided into 3*3 rectangles. Herein, the solid lines indicate edges of the screen and the dotted lines indicate grids. In the 3*3 grid configuration, the size of font and displayed in the interface of the terminal device are larger.

When it is required for a user to switch the grid configuration of the interface of the terminal device, for example, from a first grid configuration to a second grid configuration, the terminal device acquires the second grid configuration which is configured in advance.

At step 202, the first grid configuration is removed and the second grid configuration is adopted as the current grid configuration of the interface of the terminal device.

At step 203, a length ratio is acquired by comparing a length of the widget with a length of a grid. Furthermore, the number of latitudinal grids occupied by the widget is acquired according to the length ratio.

At step 204, a width ratio of a width of the widget to a width of the grid is acquired and the number of longitudinal grids occupied by the widget is acquired according to the width ratio.

For example, assuming that the length of the widget is A, the width thereof is B, the length of the grid is a and the width thereof is b, the length ratio is A/a and the width ratio is B/b.

Figure 4A:
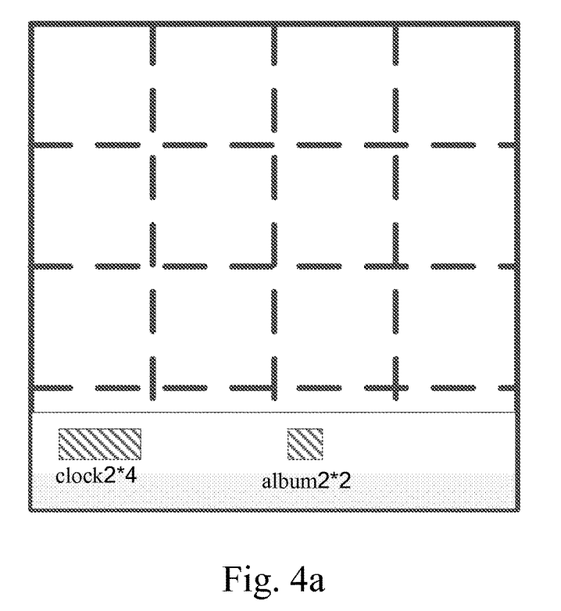
FIG. 4a is a diagram showing grids attributes displayed by the widget in a first grid configuration according to an embodiment of the present disclosure.
Figure 4B:
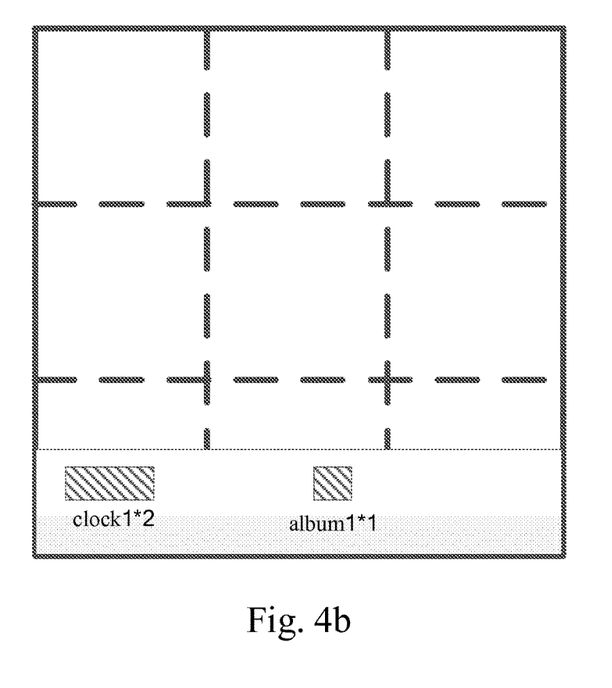
FIG. 4b is a diagram showing displayed grids attribute of the widget in a second grid configuration according to an embodiment of the present disclosure.

At step 205, a location of the widget on the interface of the terminal device is adjusted according to the number of grids occupied by the widget. If the widget is located on the interface of a terminal device, the location of the widget on the interface is adjusted according to the number of grids occupied by the widget. If the widget isn't located on the interface of the terminal device, the grid attributes displayed by the widget is adjusted according to the number of grids occupied by the widget. FIG. 4a shows grid attributes displayed by each widget when the grid configuration is 4*4. FIG. 4b shows grid attributes displayed by each widget when the grid configuration is 3*3. Therefore, if the grid configuration is changed, the number of grids occupied by each widget is correspondingly changed.

Hereafter, the step of adjusting of the location of the widget on the interface of the terminal device according to the number of grids occupied by the widget will be described in detail in several following situations.

Followed please refer to a first situation, where the widget is aligned with grids if the number of grids occupied by a widget is an integer.

Figure 5A:
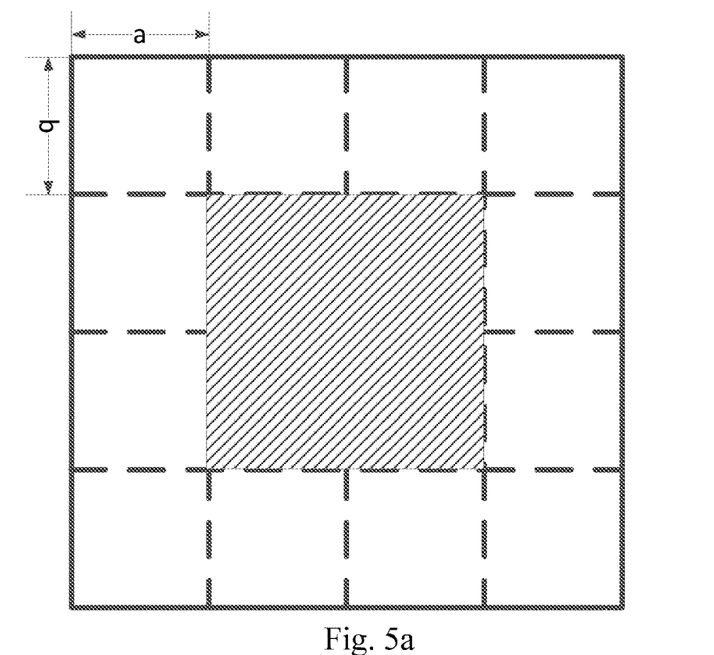
FIG. 5a is a diagram showing the number of grids occupied by an album widget in a 4*4 grid configuration.
Figure 5B:
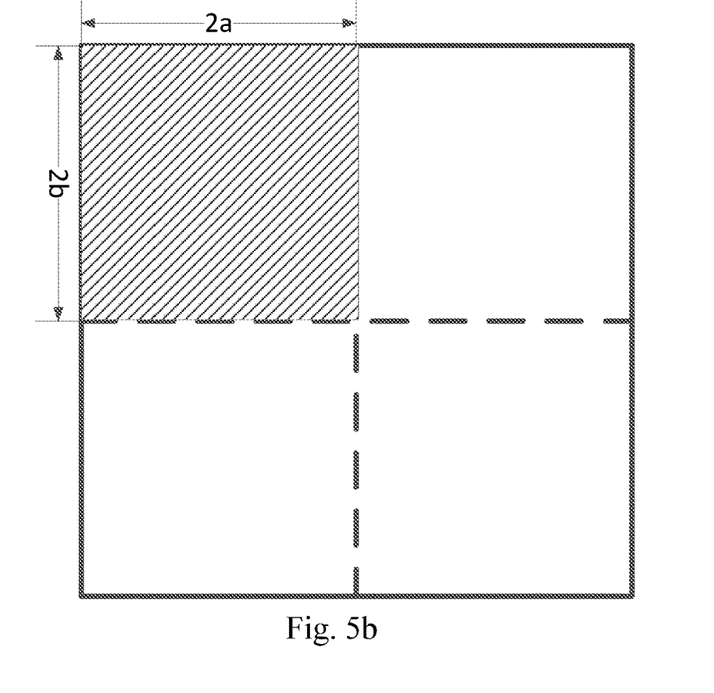
FIG. 5b is a diagram showing the number of grids occupied by an album widget in a 2*2 grid configuration according to an embodiment of the present disclosure.

For example, the grid configuration of the terminal interface is converted from a 4*4 grid configuration to a 2*2 grid configuration. Assuming that a length of each grid is a and a width of each grid is b in the 4*4 grid configuration, a length of each grid is 2a and a width thereof is 2b in the 2*2 grid configuration. A length of an album widget is 2a and the width thereof is 2b, the number of grids occupied by the widget is 2*2 in a 4*4 grid configuration, as shown in FIG. 5a. When the grid configuration of the interface of a terminal device is converted from the 4*4 grid configuration to the 2*2 grid configuration, the number of latitudinal grids occupied by the album widget is 2a/2a=1, and the number of longitudinal grids occupied by the album widget is 2b/2b=1. Accordingly, as shown in FIG. 5b, the widget is aligned with grids.

Followed please refer to a second situation, where the widget is aligned with a center at its external-connected grids if the number of grids occupied by the widget isn't an integer.

Figure 5C:
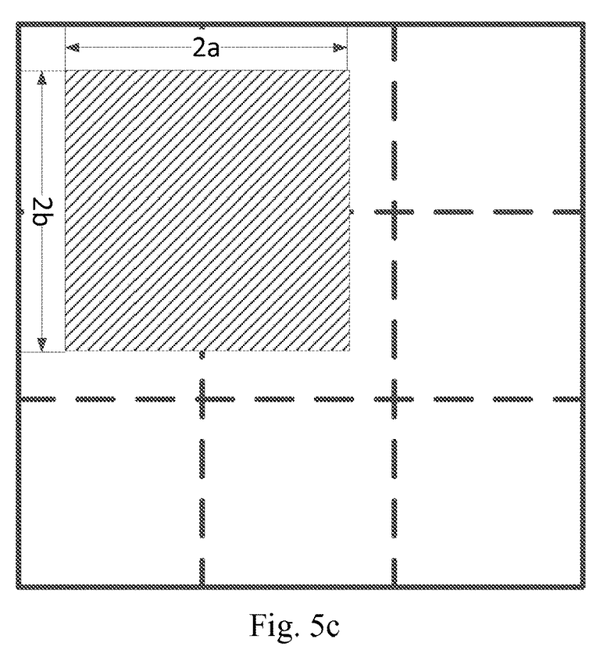
FIG. 5c is a diagram showing the number of grids occupied by an album widget in a 3*3 grid configuration according to an embodiment of the present disclosure.

For example, the grid configuration of the interface of the terminal device is converted from a 4*4 grid configuration to a 3*3 grid configuration. Assuming that a length of each grid is a and a width of each grid is b in the 4*4 grid configuration, a length of each grid is c and a width of each grid is d in the 3*3 grid configuration, wherein c=4a/3 and d=4b/3. A length of an album widget is 2a and the width thereof is 2b, the number of grids occupied by the widget is 2*2 in the 4*4 grid configuration, as shown in FIG. 5a. When the grid configuration of the interface of the terminal device is converted from the 4*4 grid configuration to the 3*3 grid configuration, the number of latitudinal grids occupied by the album widget is 2a/c=1.5, and the number of longitudinal grids occupied by the album widget is 2b/d=1.5. Because the size of the album widget is not an integer multiple of the unit grid, as shown in FIG. 5c, the widget is centrally arranged in its external-connected grids in order to have a good display effect. Herein, the external-connected grids include the grids constituted by the grid lines closest to the widget. For example, the four grids locating in the upper left corner are the external-connected grids of the widget in FIG. 5c.

Followed please refer to a third situation, where the widget is aligned with grids after the length or the width of the widget is stretched to be an integer, if the number of grids occupied by the widget isn't an integer.

Figure 5D:
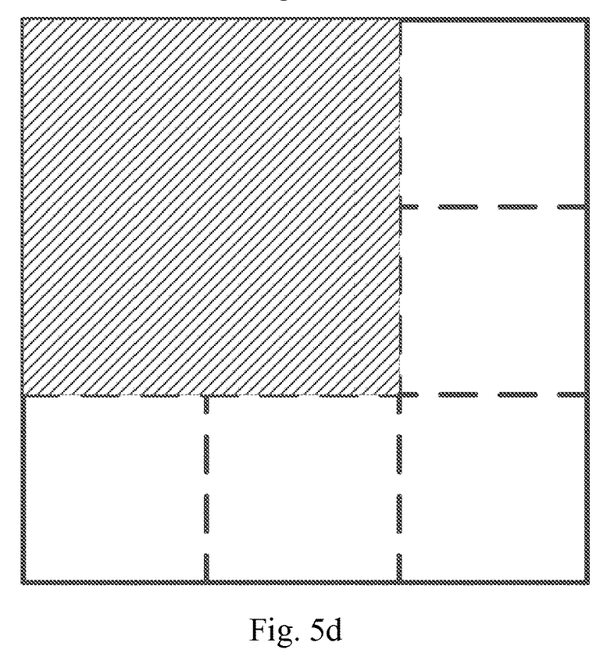
FIG. 5d is another diagram showing the number of grids occupied by the album widget in the 3*3 grid configuration according to an embodiment of the present disclosure.

On basis of the above second situation, i.e., the number of latitudinal grids occupied by the widget is 2a/c=1.5 and the number of longitudinal grids occupied by the widget is 2b/d=1.5, the length of the widget is stretched from 2a to 2c, and the width of the widget is stretched from 2b to 2d. As a result, the number of widget occupied by the album widget is 2*2. Then, the widget is aligned with grids and the alignment effect is shown in FIG. 5d.

Followed please refer to a fourth situation, where the widget is aligned with grids after the length or the width of the widget is contracted to be an integer, if the number of grids occupied by the widget isn't an integer.

Figure 5E:
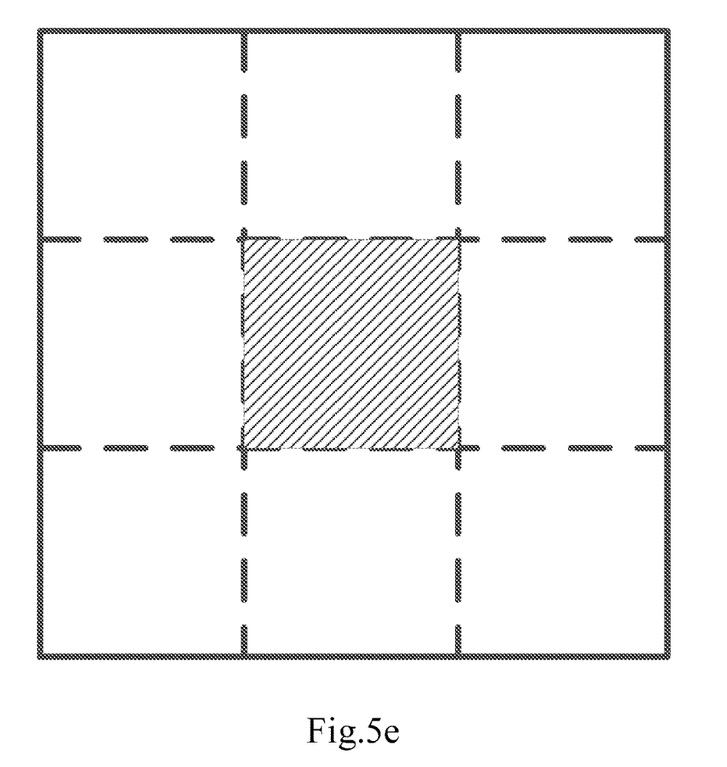
FIG. 5e is a yet diagram showing the number of grids occupied by the album widget in the 3*3 grid configuration according to an embodiment of the present disclosure.

On basis of the above second situation, i.e., the number of latitudinal grids occupied by the widget is 2a/c=1.5 and the number of longitudinal grids occupied by the widget is 2b/d=1.5, the length of the widget is contracted from 2a to c, and the width of the widget is contracted from 2b to d. As a result, the number of widget occupied by the album widget is 1*1. Then, the widget is aligned with grids and the alignment effect is shown in FIG. 5e.

It can be seen from the above described contents that in the method for adjusting a widget according to the embodiment of the present disclosure, the size of the widget can be automatically converted into the number of grids in the current grid configuration such that the size of a widget won't be changed or adapted to the size of the current unit grid, thus the display effect may be improved and the user experience may be improved.

Based on the identical inventive concept, the embodiments of the present disclosure further provide an apparatus and a terminal device for adjusting a widget. Since the principle for solving the problems by the apparatus and the terminal device is similar to the above method for adjusting a widget, the implementation of the apparatus and the terminal device may refer to the implement of the method, description of which will be not repeated herein.

Figure 6:
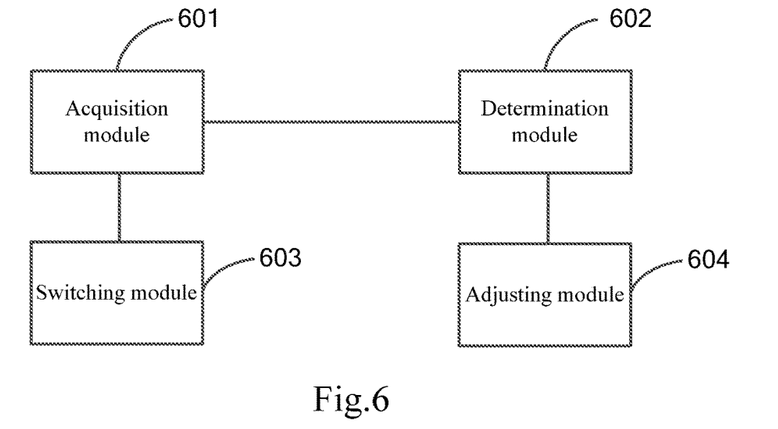
FIG. 6 is a block diagram of an apparatus for adjusting a widget according to an embodiment of the present disclosure.

An apparatus for adjusting a widget according to an embodiment of the present disclosure includes the following modules, as shown in FIG. 6.

An acquisition module 601 is configured to acquire a size value of the widget on an interface of a terminal device after a grid configuration of the interface of a terminal device is switched from a first grid configuration to a second grid configuration.

A determination module 602 is configured to determine the number of grids occupied by the widget according to size values of each grid in the second grid configuration.

Optionally, the apparatus further includes a switching module 603 configured to acquire a selected second grid configuration after receiving a request for switching a grid configuration of the interface of a terminal device, remove a first grid configuration, and adopt the second grid configuration as the current grid configuration of the interface of the terminal device.

Optionally, the determination module 602 is configured to acquire a length ratio by comparing of a length of the widget with a length of a grid; to obtain the number of latitudinal grids occupied by the widget according to the length ratio; to acquire a width ratio by comparing a width of the widget with a width of the grid and to obtain the number of longitudinal grids occupied by the widget according to the width ratio.

Optionally, the apparatus further includes an adjusting module 604 configured to adjust the location of the widget on the interface of the terminal device according to the number of grids occupied by the widget if the widget is located on the interface of the terminal device, and to adjust grid attributes displayed by the widget according to the number of grids occupied by the widget if the widget isn't located on the interface of the terminal device.

Optionally, the adjusting module 604 is configured to align the widget with grids if the number of grids occupied by the widget is an integer; and to align the widget with a center at its external-connected grids if the number of grids occupied by the widget isn't an integer, or to align the widget with grids after the length or the width of the widget is stretched or contracted to be an integer.

The embodiments of the present disclosure further provide a terminal device including the above apparatus according to the embodiments of the present disclosure. The terminal device may be various terminals, such as a phone, a tablet, an ipad and so on.

Through the above description of the above implementations, it should be understood by those skilled in the art, that the embodiments of this disclosure may be implemented by hardware as well as software in combination with the necessary general hardware platform. Based on this understanding, the technical solution of the embodiments of this disclosure can be manifested in the form of a software product which may be stored in a non-volatile storage medium (for example, a CD-ROM, U disk, hard disk, etc.) and includes several instructions to enable a computer device (for example, a personal computer, a server, or a network device, etc.) to execute the method according to embodiments of the present disclosure.

Figure 7:
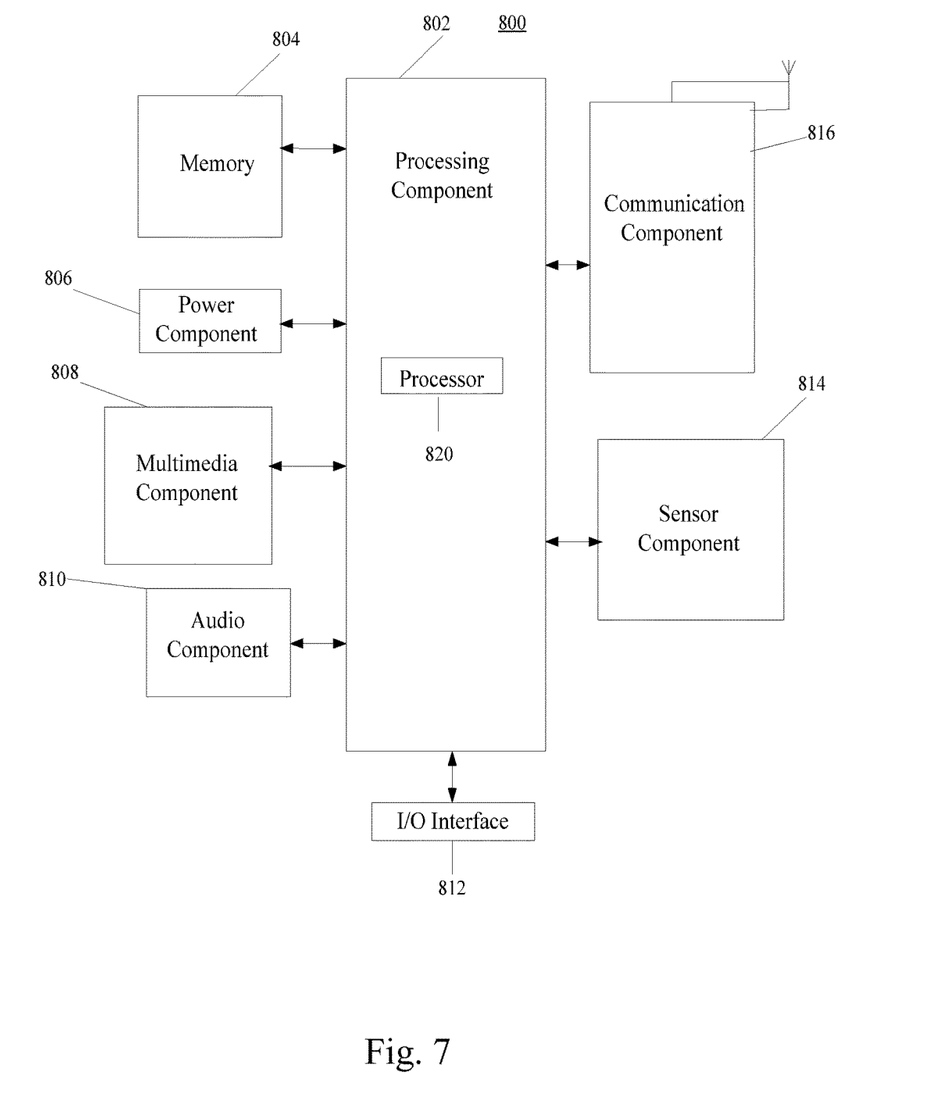
FIG. 7 is a block diagram of a terminal device according to an embodiment of the present disclosure.

FIG. 7 is a block diagram of a terminal device 800 for adjusting a widget according to an exemplary embodiment. For example, the terminal device 800 may be a mobile phone, a computer, a digital broadcast terminal, a messaging device, a gaming console, a tablet, a medical device, exercise equipment, a personal digital assistant, and the like.

Referring to FIG. 7, the terminal device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal device 800. Examples of such data include instructions for any applications or methods operated on the terminal device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal device 800. The power component 806 may include a power management system, one or more power sources, and any other components associated with the generation, management, and distribution of power in the terminal device 800.

The multimedia component 808 includes a screen providing an output interface between the terminal device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the terminal device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal device 800. For instance, the sensor component 814 may detect an open/closed status of the terminal device 800, relative positioning of components, e.g., the display and the keypad, of the terminal device 800, a change in position of the terminal device 800 or a component of the terminal device 800, a presence or absence of user contact with the terminal device 800, an orientation or an acceleration/deceleration of the terminal device 800, and a change in temperature of the terminal device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal device 800 and other devices. The terminal device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the terminal device 800, for performing the above-described methods. For example, the non-transitory computer-readable storage medium may be a ROM, a RAM, a CD-ROM, a magnetic tape, a floppy disc, an optical data storage device, and the like.

It should be understood by those skilled in the art, that the appended drawings are only a schematic diagram of a preferred embodiment, the modules or processes in the appended drawings are not necessarily required by the implementation of the present disclosure.

It should be understood by those skilled in the art, that the modules in the apparatus in the embodiments may be distributed in the apparatus according to the above description, and may be also distributed in an apparatus or several apparatuses in an embodiment different from the above embodiments. The modules in the embodiments be combined into one module and may be further divided into several sub modules.

The serial number of the present invention implementation is only used for the description and does not represent superior or inferior of the embodiments.

The method and the apparatus for adjusting a widget and the terminal device according to the embodiments of the present disclosure can automatically convert the size of the widget into the number of grids in the current grid configuration such that the size of a widget isn't changed or is adapted to the size of the current unit grid, whereby the display effect may be improved and the user experience may be improved.

Apparently, those skilled in the art may make various modifications and variations to the disclosure without departing the spirit and scope of the disclosure. Thus, the disclosure intends to include these modifications and variations if they belong to the scope of the claims of the disclosure and the equivalent technology thereof.

What is claimed is:

1. A method for adjusting a widget displayed on an interface of a terminal device, comprising:

acquiring, by a processor of the terminal device, a size value of the widget displayed on the interface after switching a grid configuration of the interface from a first grid configuration to a second grid configuration;

determining, by the processor, the number of grids occupied by the widget according to size values of each grid in the second grid configuration;

adjusting, by the processor, a displayed location of the widget on the interface according to the number of grids occupied by the widget if the widget is located on the interface; and adjusting, by the processor, grid attributes displayed by the widget according to the number of grids occupied by the widget if the widget is not located on the interface;

displaying, by a screen of the terminal device, the widget on the interface of the terminal device.

2. The method according to claim 1, wherein switching the grid configuration of the interface from the first grid configuration to the second grid configuration comprises:

acquiring, by the processor, a selected second grid configuration after receiving a request for switching the grid configuration of the interface;

removing, by the processor, the first grid configuration; and adopting, by the processor, the second grid configuration as the current grid configuration of the interface.

3. The method according to claim 1, wherein determining the number of grids occupied by the widget according to the size values of each grid in the second grid configuration comprises:

acquiring, by the processor, a length ratio by comparing a length of the widget with a length of a grid;

acquiring, by the processor, a width ratio by comparing a width of the widget with a width of the grid; and obtaining, by the processor, the number of latitudinal grids occupied by the widget according to the length ratio and the number of longitudinal grids occupied by the widget according to the width ratio.

4. The method according to claim 1, wherein adjusting the displayed location of the widget on the interface according to the number of grids occupied by the widget comprises:

aligning, by the processor, the widget with grids if the number of grids occupied by the widget is an integer; and aligning, by the processor, the widget with a center at its external-connected grids if the number of grids occupied by the widget is not an integer.

5. The method according to claim 4, wherein adjusting the displayed location of the widget on the interface according to the number of grids occupied by the widget further comprises:

aligning, by the processor, the widget with the grids after the length or the width of the widget is stretched or contracted to be an integer, if the number of grids occupied by the widget is not an integer.

6. The method according to claim 3, wherein adjusting the displayed location of the widget on the interface according to the number of grids occupied by the widget comprises:

aligning, by the processor, the widget with grids if the number of grids occupied by the widget is an integer, and aligning, by the processor, the widget with a center at its external-connected grids if the number of grids occupied by the widget is not an integer.

7. The method according to claim 6, wherein adjusting the displayed location of the widget on the interface according to the number of grids occupied by the widget further comprises:

aligning the widget with the grids after the length or the width of the widget is stretched or contracted to be an integer, if the number of grids occupied by the widget is not an integer.

8. A terminal device for adjusting a widget displayed on an interface of the terminal device, comprising:

a processor; and a memory for storing instructions executable by the processor, wherein the processor is configured to perform:

acquiring a size value of the widget displayed on the interface after switching a grid configuration of the interface from a first grid configuration to a second grid configuration;

determining the number of grids occupied by the widget according to size values of each grid in the second grid configuration;

adjusting a displayed location of the widget on the interface according to the number of grids occupied by the widget if the widget is located on the interface; and adjusting grid attributes displayed by the widget according to the number of grids occupied by the widget if the widget is not located on the interface;

displaying, by a screen of the terminal device, the widget on the interface of the terminal device.

9. The terminal device according to claim 8, wherein switching the grid configuration of the interface from the first grid configuration to the second grid configuration comprises:

acquiring a selected second grid configuration after receiving a request for switching the grid configuration of the interface;

removing the first grid configuration; and adopting the second grid configuration as the current grid configuration of the interface.

10. The terminal device according to claim 8, wherein determining the number of grids occupied by the widget according to the size values of each grid in the second grid configuration comprises:

acquiring a length ratio by comparing a length of the widget with a length of a grid;

acquiring a width ratio by comparing a width of the widget with a width of the grid; and obtaining the number of latitudinal grids occupied by the widget according to the length ratio and the number of longitudinal grids occupied by the widget according to the width ratio.

11. The terminal device according to claim 8, wherein adjusting the displayed location of the widget on the interface according to the number of grids occupied by the widget comprises:

aligning the widget with grids if the number of grids occupied by the widget is an integer; and aligning the widget with a center at its external-connected grids if the number of grids occupied by the widget is not an integer.

12. The method according to claim 11, wherein adjusting the displayed location of the widget on the interface according to the number of grids occupied by the widget further comprises:

aligning the widget with the grids after the length or the width of the widget is stretched or contracted to be an integer, if the number of grids occupied by the widget is not an integer.

13. The terminal device according to claim 10, wherein adjusting the displayed location of the widget on the interface according to the number of grids occupied by the widget comprises:

aligning the widget with grids if the number of grids occupied by the widget is an integer, and aligning the widget with a center at its external-connected grids if the number of grids occupied by the widget is not an integer.

14. The terminal device according to claim 13, wherein adjusting the displayed location of the widget on the interface according to the number of grids occupied by the widget comprises:

aligning the widget with the grids after the length or the width of the widget is stretched or contracted to be an integer, if the number of grids occupied by the widget is not an integer.

15. A non-transitory computer-readable storage medium having stored therein instructions that, when executed by a processor of a terminal device, causes the terminal device to perform a method for adjusting a widget displayed on an interface of the terminal device, the method comprising:

acquiring a size value of the widget displayed on the interface after switching a grid configuration of the interface from a first grid configuration to a second grid configuration;

determining the number of grids occupied by the widget according to size values of each grid in the second grid configuration;

adjusting a displayed location of the widget on the interface according to the number of grids occupied by the widget if the widget is located on the interface; and adjusting grid attributes displayed by the widget according to the number of grids occupied by the widget if the widget is not located on the interface;

displaying, by a screen of the terminal device, the widget on the interface of the terminal device.

* * * * *